United States Patent [19]

Kormendi et al.

[11] Patent Number: 4,852,758
[45] Date of Patent: Aug. 1, 1989

[54] PLASTIC FUEL TANK

[75] Inventors: Kalman Kormendi; Dieter Lampart, both of Ettlingen; Fritz Mannherz, Karlsbad-Spielberg; Dieter Scheurenbrand, Wolfschlugen, all of Fed. Rep. of Germany

[73] Assignee: Schmalbach-Lubeca AG, Braunschweig, Fed. Rep. of Germany

[21] Appl. No.: 213,533

[22] Filed: Jun. 30, 1988

[30] Foreign Application Priority Data

Jul. 1, 1987 [DE] Fed. Rep. of Germany ....... 3721691

[51] Int. Cl.⁴ .............................................. B65D 1/40
[52] U.S. Cl. .................... 220/20.5; 123/514; 123/518; 137/576; 220/85.5; 280/834
[58] Field of Search ............... 123/509, 510, 514, 516, 123/518; 137/576; 180/314; 280/834; 220/20.5, 72, 83, 85.5

[56] References Cited

U.S. PATENT DOCUMENTS

| | | | |
|---|---|---|---|
| 3,610,220 | 10/1971 | Yamada et al. | 123/518 |
| 4,279,232 | 7/1981 | Schuster et al. | 123/516 |
| 4,397,333 | 8/1983 | Liba et al. | 123/516 |
| 4,416,303 | 11/1983 | Scheurenbrand | 137/576 |
| 4,503,885 | 3/1985 | Hall | 123/516 |

FOREIGN PATENT DOCUMENTS 3006254 2/1980 Fed. Rep. of Germany .

Primary Examiner—George L. Walton
Attorney, Agent, or Firm—Marmorek, Guttman & Rubenstein

[57] ABSTRACT

A plastic fuel tank comprises a large main tank (1) and a small collecting tank connected to the main tank (1) by a flow-through opening (7). The collecting tank (3) is completely pulled into the underside (11) of the main tank (1), and includes vaulted lateral walls (31) which are symmetrical in all directions and expand into a bottom part (32) with an enlarged surface. The collecting tank (3) is partly surrounded by a connecting channel (8) opening from the main tank (1). The connecting channel (8) communicates with the collecting tank (3) via an admission bore (10). A nozzle (12) from the fuel return line (6) opens into the connecting channel (8) at a point opposite admission bore (10) to help propel fuel from the connecting channel (8) into the collecting tank (3).

11 Claims, 1 Drawing Sheet

PLASTIC FUEL TANK

BACKGROUND OF THE INVENTION

The instant invention relates to a plastic fuel tank for combustion engines. More particularly, the instant invention relates to a plastic fuel tank comprising a large main tank and a smaller collecting tank which is connected to the main tank via a flow-through opening located in the underside of the main tank.

The collecting tank to which the fuel suction line and the fuel return line are connected constitutes the fuel reserve which is required for trouble-free operation of the motor. This arrangement prevents air from being sucked into the fuel suction line, especially when the fuel level in the main tank is low and the brakes are applied, or the vehicle is accelerated or driven around curves.

In order to ensure the reliability of this function, the collecting tank has up to now been installed outside the main tank, i.e., beneath its underside (see, e.g., German Pat. No. PS 30 06 254) because a total utilization of the fuel reserve from the main tank appeared to be possible only if the collecting tank was located in this lowest position. However, such an arrangement of the collecting tank outside and below the main tank has obvious disadvantages, especially if the fuel tank is located on the outside of the vehicle near its underside. In this position, the collecting tank is exposed to excessive unevenness in the road, obstacles on the road, ice accumulations, etc.

Even when the fuel tank is located within the vehicle, as is the case more and more often in modern vehicles, a collecting tank located outside the main fuel tank is seen as a disadvantage because it affects optimal utilization of the space available for the main tank. Such an arrangement also reduces the amount of fuel in the main tank which can be theoretically used.

It is therefore an objective of the instant invention to design a plastic fuel tank in such manner that it can be built by a blowing or blister process and has improved spatial characteristics while ensuring reliable fuel supply to the engine and eliminating the disadvantages of known fuel tanks.

SUMMARY ON THE INVENTION

This objective has been achieved by means of the present invention which provides a plastic fuel tank comprising a main tank and a collecting tank connected to each other through a narrow flow-through opening. The collecting tank is articulated into the underside of the main tank and is thus enclosed within the outer contour of the fuel tank. The shape of the collecting tank is defined by means of a vaulted lateral wall which is symmetrical all around and expands from its relatively small flow-through opening, becoming a round bottom part with surface dimensions that are several times greater than those of the cross section of the flow-through opening. A connecting channel goes around the collecting tank and communicates with the collecting tank via a tangentially attached admission bore. The fuel return line is positioned so that it opens into the connecting channel through a nozzle pointing into the admission bore and is directed tangentially towards the collecting tank.

The special advantages of the fuel tank according to the instant invention consist above all in the fact that it no longer has any parts projecting beyond its outer contour and in that practically complete consumption of the fuel supply is possible even though the collecting tank is pulled into the space of the main tank. The vaulted side wall of the collecting tank which widens symmetrically all around starting at the flow-through opening makes it possible to achieve uniform circulation and steady degassing of the fuel within the collecting tank. The connecting channel incorporated into the underside of the main tank and going around the collecting tank ensures reliable arrival of the remaining fuel from all areas of the tank towards the collecting tank, even when the fuel level is extremely low. The continual delivery of fuel from the connecting channel is assisted by the fuel return line and its return nozzle pointing into the admission bore. Due to this arrangement, the fuel return line acts as a jet pump for delivering fuel into the collecting tank. The advantageous, uniform flow through the collecting tank is impelled by the tangential arrangement of the admission bore and of the return nozzle, and the return of fuel from the collecting tank into the main tank is practically impossible, even under the most difficult of driving conditions.

BRIEF DESCRIPTION OF THE DRAWINGS

An embodiment of the invention is explained below with reference to the drawings in which.

DETAILED DESCRIPTION OF PREFERRED EMBODIMENT

Figure 1:
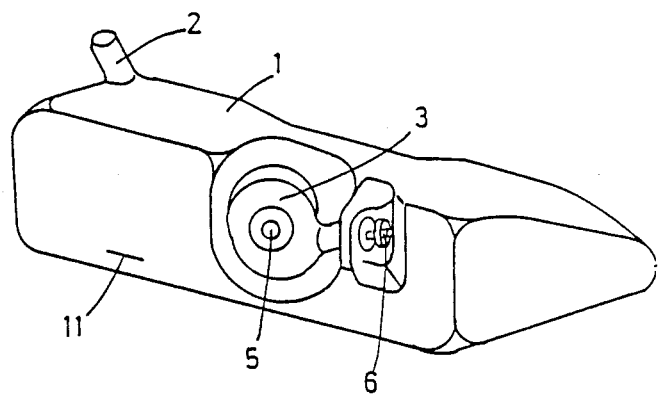
FIG. 1 is an overall view of the plastic fuel tank, viewed from its underside.
Figure 2:
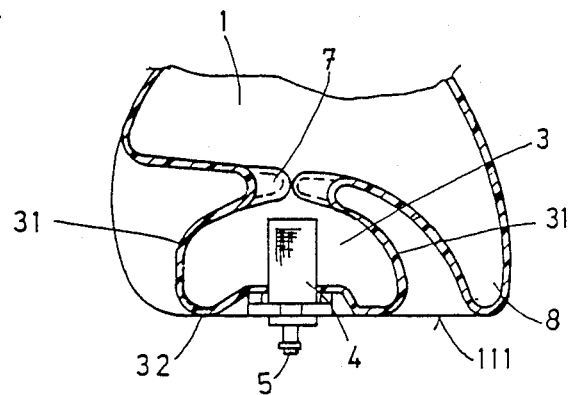
FIG. 2 is a sectional view of the fuel tank of FIG. 1 showing the collecting tank.

For the sake of clarity, the plastic fuel tank has been shown on its side in FIG. 1. In practice it would be installed in the vehicle standing on its underside 11, behind a row of seats. The entire tank comprises a main tank 1 with a filling piece 2 and a collecting tank 3 with a fuel filter 4. The fuel tank also includes a connection fitting 5 for the fuel suction line and a connection fitting 6 for the fuel return line.

The collecting tank 3 is entirely pulled into the underside 11 of the main tank 1 and is thus enclosed within the outer contour 111 of the overall fuel tank. The internal connection between the collecting tank 3 and the main tank 1 consists of a flow-through opening 7. Starting at the flow-through opening 7, the collecting tank 3 is defined by a vaulted lateral wall 31, symmetrical in all directions, which enlarges into a bottom part 32 having a cross-section that is several times larger than that of the flow-through opening 7.

Figure 3:
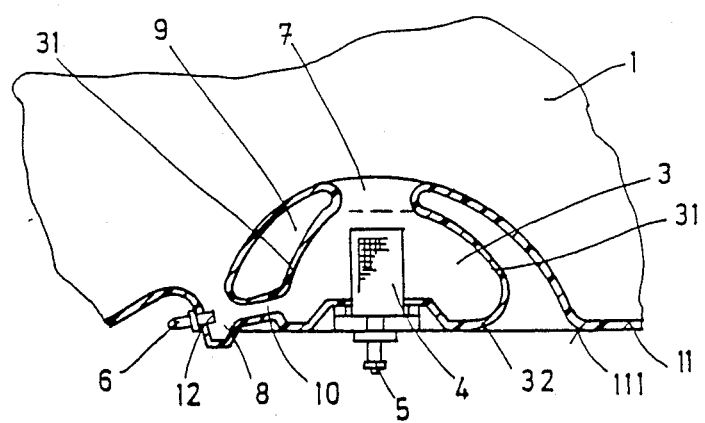
FIG. 3 is a lateral view of the section of FIG. 2.

A connecting channel 8 going around the collecting tank 3 is formed in the bottom of the main tank 1. Connecting channel 8 takes up residual fuel from the overall main tank 1 and feeds it to the collecting tank 3 when the tank 1 approaches empty. The connecting channel 8 is brought near a point in the vaulted lateral wall of the collecting tank 3 where there is a constriction 9 of material, thus forming admission bore 10 (FIG. 3) through which fuel can enter the collecting tank 3 from connecting channel 8. At this point the fuel return line 6 also has a nozzle 12 for delivering fuel into the connecting channel 8. The nozzle 12 is arranged in such manner that it points directly into the admission bore 10. The admission bore 10 as well as the return nozzle 12 are oriented tangentially to the interior of the collecting tank 3 (FIG. 1).

Since the returned fuel is subjected to an over-pressure from a fuel pump, it is accelerated through nozzle 12. The fuel flowing into the connecting channel 8 which is under normal pressure is forced into admission bore 10 and on into the collecting tank 3 under the prevailing jet pump effect from nozzle 12. Degassing occurs here as the flow abates, and the fuel proceeds through filter 4 into the suction circuit 5.

In this manner the vehicle can be driven until the fuel tank is practically empty, even though the collecting tank 3 is articulated entirely within the main tank 1, thus providing the advantages of construction and operation that were mentioned earlier.

While the invention has been described by reference to specific embodiments, this was for purposes of illustration only and should not be construed to limit the spirit and scope of the invention.

We claim:

1. A plastic fuel tank for supplying fuel to combustion engines, comprising,
   a main tank having an outer wall defining an outer contour of said fuel tank,
   a collecting tank in fluid communication with said main tank through a flow-through opening, said collecting tank being articulated in an underside of said main tank and being enclosed within said outer contour of said fuel tank,
   said collecting tank including a vaulted lateral wall extending from said flow-through opening to a bottom part of said collecting tank,
   a connecting channel formed in the underside of said main tank and circumscribing said vaulted lateral wall, said connecting channel being connected to said collecting tank via an admission bore, and
   a nozzle from a fuel return line opening into said connecting channel and being oriented towards said admission bore so as to act as a jet pump for propelling fuel from said connecting channel into said collecting tank.

2. The plastic fuel tank of claim 1 wherein said vaulted lateral wall extends symmetrically from the flow-through opening.

3. The plastic fuel tank of claim 2 wherein said admission bore and said nozzle are tangentially oriented towards said collecting tank.

4. The plastic fuel tank of claim 1 wherein said bottom part of said collecting tank is a pot-shaped round bottom part.

5. A fuel tank for supplying fuel to combustion engines, comprising,
   a main tank having an outer wall defining an outer contour of said fuel tank,
   a collecting tank in fluid communication with said main tank through a flow-through opening, said collecting tank being articulated in an underside of said main tank and being enclosed within said outer contour of said fuel tank,
   said collecting tank including a vaulted lateral wall extending from said flow-through opening to a bottom part of said collecting tank said vaulted lateral wall substautrally circumscribing and collecting tank, and
   means located outside said vaulted lateral wall for increasing delivery of fuel from said main tank to said collecting tank when the level of fuel in said main tank falls below said flow-through opening.

6. The fuel tank of claim 5 wherein said fuel tank is made from plastic.

7. The fuel tank of claim 5 wherein said fuel delivery means comprises a connecting channel formed in the underside of said main tank, said connecting channel being connected to said collecting tank via an admission bore.

8. The fuel tank of claim 7 wherein said fuel delivery means further comprises a nozzle from a fuel return line opening into said connecting channel and being oriented towards said admission bore so as to act as a jet pump for propelling fuel from said connecting channel into said collecting tank.

9. The plastic fuel tank of claim 8 wherein said admission bore and said nozzle are tangentially or lented towards said collecting tank.

10. The plastic fuel tank of claim 5 wherein said vaulted lateral wall extends symmetrically from the flow-through opening.

11. The plastic fuel tank of claim 5 wherein said bottom part of said collecting tank is a pot-shaped round bottom part.

* * * * *